Dec. 4, 1934. S. S. FURRER 1,982,951
DISK HARROW
Filed Feb. 8, 1932 2 Sheets-Sheet 1

INVENTOR:
Samuel S. Furrer,
BY
ATTORNEY.

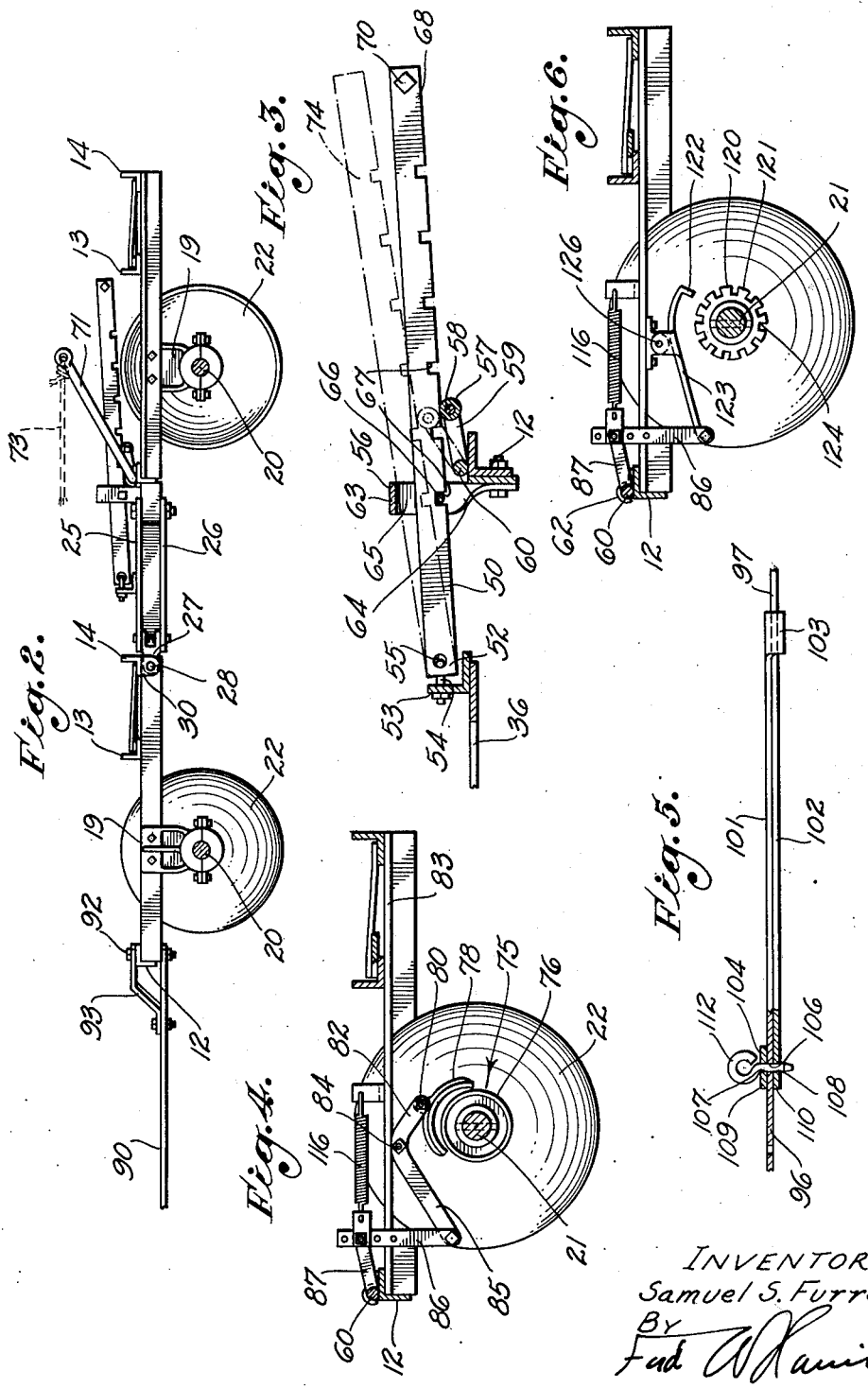

Patented Dec. 4, 1934

1,982,951

UNITED STATES PATENT OFFICE 1,982,951

DISK HARROW

Samuel S. Furrer, Oxnard, Calif., assignor to Brenneis Manufacturing Company Inc., Oxnard, Calif., a corporation of California Application February 8, 1932, Serial No. 591,647

14 Claims. (Cl. 55—83)

My invention relates to agricultural implements and relates especially to an improved and simplified disk harrow having leading and following sections adapted to be operated in angular relationship, together with an improved means for positively controlling the opening and closing movement of the leading and following sections.

The provision in disk harrows of means for positively moving the leading and following sections from closed to open position, or vice versa, as may be required in the operation of the disk harrows, has long been recognized by designers of disk harrows, and various more or less complicated devices have been provided for accomplishing this desired control of the leading and following sections. In my new disk harrow I employ a simple control means which may be actuated by an operator seated on a tractor, such control means including a brake for retarding the movement of the following section. When such brake is applied, the following section tends to remain stationary while the leading section is moved by the tractor, thereby causing the following section to swing relative to the leading section. The value of this feature of my invention will appear in the following part of the specification.

It is also an object of my invention to provide in an agricultural implement of the above character holding or locking means for maintaining the leading and following sections in a desired position of angularity, together with means for releasing the holding or locking means and actuating the brake.

It is a further object of my invention to provide a releasing and brake-actuating means in which the holding or locking means will be released prior to the actuation of the brake, thereby making it possible to release the holding means without actuating the brake should the operator so desire.

It is a further object of the invention to provide a draft means for an agricultural implement of the character described having adjustable parts which are slidably secured together and are locked in a desired position of operation by a pin adapted to be inserted through openings which pass through the slidable members. This feature of my invention makes it possible for the operator to quickly adjust the implement so that it will operate in a desired offset position, without the necessity of removing and replacing bolts or screws, but by merely removing a pin and re-inserting this pin in another set of openings.

Further objects and advantages of the invention will be made evident throughout the following part of the specification.

Referring to the drawings, which are for illustrative purposes only,

Fig. 2 is an elevational view taken from a position indicated by the line 2—2 of Fig. 1.

Fig. 3 is an enlarged, fragmentary sectional view taken on a plane represented by the line 3—3 of Fig. 1, this view showing the locking or holding means and the manner in which such locking or holding means is released.

Fig. 4 is an enlarged fragmentary section on a plane represented by the line 4—4 of Fig. 1, showing the simple brake and actuating means of the invention.

Fig. 5 is a fragmentary, partly sectional view taken on a plane represented by the line 5—5 of Fig. 1, showing the adjustable draft means of the invention.

Fig. 6 is a fragmentary, somewhat schematic view, showing an alternative form of brake means for the following section of the agricultural implement.

Figure 1:
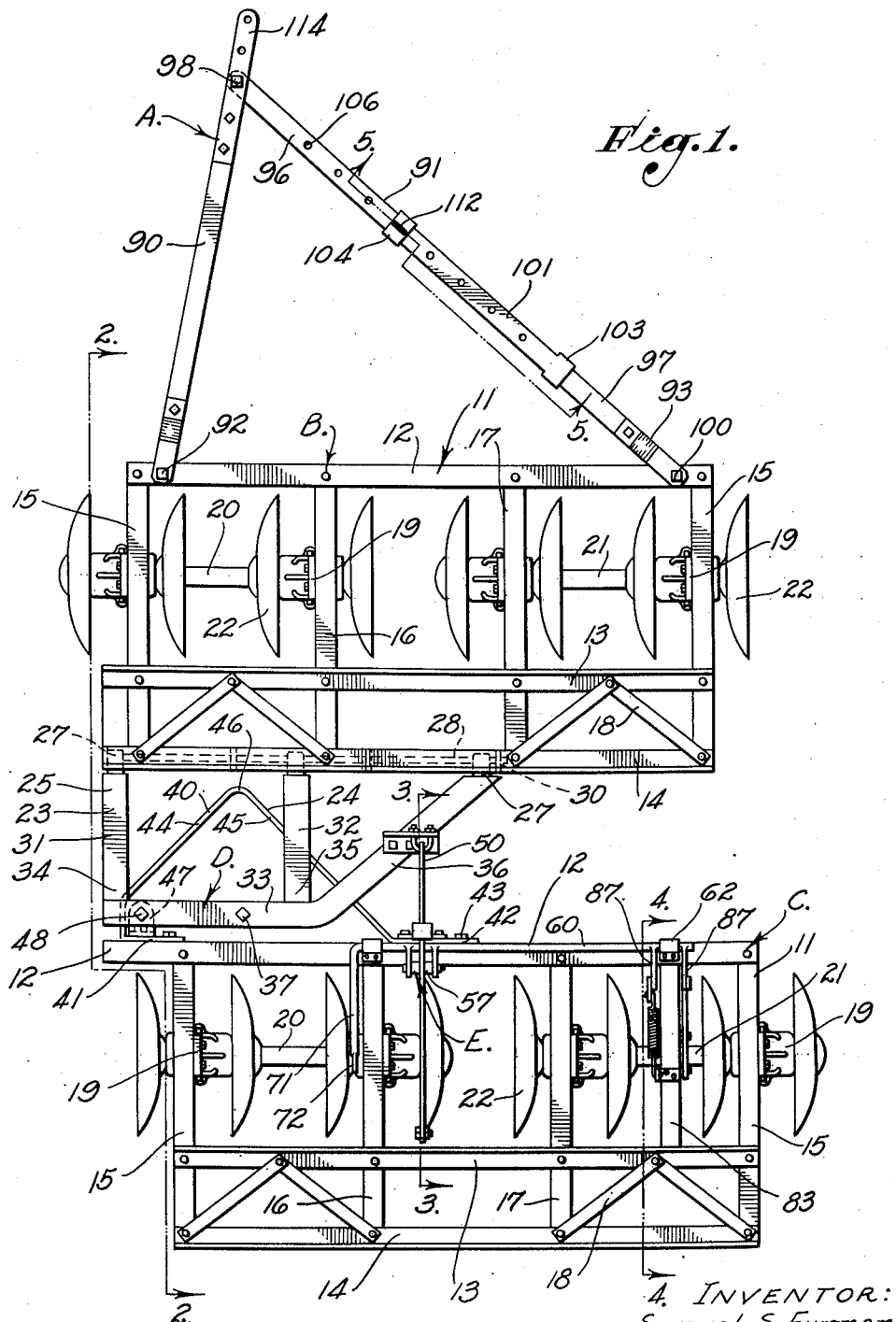
Fig. 1 is a plan view of a preferred embodiment of my invention.

Referring now to the drawings, the preferred embodiment of my new harrow includes a draft means A which is connected to the front portion of a leading section B, a following section C, and pivot or hinge means D for securing the following section to the rearward portion of the leading section B.

The leading and following harrow sections B and C may be of any recognized construction. In the drawings I show each section B and C as consisting of a horizontal frame 11 comprising three parallel structural steel members 12, 13, and 14 having end and intermediate bars 15, 16, and 17 secured thereto by means of bolts or rivets, these frames 11 being reinforced by diagonal braces 18. Secured to the end and intermediate bars 15, 16, and 17 are bearing members 19 which project downwardly and support shafts 20 and 21 carrying cutter disks 22. The shafts 20 and 21 of each section B and C are placed in axial alignment, but are independently rotatable so as to permit the disks at one side to rotate faster than the disks at the other side when the harrow is making a turn.

The connecting means D employs two cooperating parts 23 and 24, one of which parts is connected to one of the harrow sections, and the other of which parts is connected to the other of the harrow sections. The part 23 is preferably secured to the leading section B and consists of an upper portion 25 and a lower portion 26, there being hinge members 27 at the forward end of the member 23 which engage a horizontal, laterally directed shaft 28 secured to the rearward portion of the frame 11 of the front section B by means of brackets 30. Accordingly, the member 23 may swing on the shaft 28 relative to a horizontal axis defined by such shaft 28. The upper and lower members 25 and 26 comprise essentially upper and lower horizontal flat walls which may be fabricated from flat steel stock in the manner shown in Fig. 1, it being understood that the member 26 is essentially a duplicate of the upper member 25 which includes a pair of flat bars 31 and 32 extending from the leftward and middle hinge members 27, and which member 25 further includes a laterally extending flat bar 33 welded to the rearward ends 34 and 35 of the bars 31 and 32, the rightward end 36 of the flat bar 33 being bent diagonally forwardly to connect with the rightward hinge member 27. The rearward ends of the upper and lower members 25 and 26 are supported in spaced relationship by means of a vertical spacing means 37 which may consist of a shouldered bolt or a bolt with a spacing sleeve positioned thereon between the members 25 and 26.

The member 24 is in the form of a projection adapted to be secured to the front portion of the rearward or following section C in a position to project into the opening between the upper and lower members 25 and 26 of the member 23. This member 24 is preferably formed from a flat bar 40 having its greatest cross sectional dimension vertically disposed, or, in other words, the bar 40 is employed in "on edge" position. The bar 40 is bent so as to provide a pair of laterally directed feet 41 and 42 by which the member 24 may be secured to the front member 12 of the rearward frame 11 by securing means, such as bolts 43. The portion of the bar 40 connecting between the feet 41 and 42 is of inverted V-shape and is composed of portions 44 and 45 which converge and meet at an apex 46. To the leftward portion of the member 24 adjacent the foot 41, a body 47 is secured, this body 47 having a vertical opening therein for receiving a hinge-pin or bolt 48 which passes through openings in the upper and lower bars 33 of the upper and lower members 25 and 26. The hinge-pin 48 provides a pivot on which the following member C may swing through a horizontal plane relative to the leading section B. It will be perceived that the following section C is secured to the leading section B so as to swing on the horizontal laterally directed shaft 28, such flexible connection of the members B and C permitting these members to adjust themselves to the ground surface over which the harrow is moved.

For the purpose of controlling or determining the angular position, or non-angular position, of the following section C relative to the leading section B, I provide an adjustable interconnecting means E which includes a longitudinally extending bar 50, the effective length of which may be varied in a manner to determine the distance between the rightward portions of the sections B and C. In my preferred construction the bar 50 has its forward end 52 pivotally connected to the rightward portion of the member 23, which is in turn connected to the leading section B. For this purpose I provide an angle plate 53 secured to the diagonal portion 36 and having a U-bolt 54 secured in the upstanding web thereof and engaging an opening 55 in the end 52 of the bar 50. From the U-bolt 54 the bar 50 extends rearwardly through a guide 56 mounted on the front member 12 of the rear frame 11, and projects over a releasing roller 57 which is mounted on a shaft 58 extended between the ends of lever arms 59 which project rearwardly from a crank shaft 60, secured to the member 12 of the rearward frame 11 by use of journals 62. The guide 56 consists of a piece of flat steel bent to inverted U-shaped form, and secured to the member 12 with the closed end 63 disposed upwardly and the legs 64 thereof secured to the member 12. Accordingly, the member 56 provides an opening 65 through which the bar 50 may slide. Across the intermediate portion of the opening 65, a stop member or bolt 66 is extended, and in the lower edge of the bar 50 notches 67 are formed, and in the rearward end 68 of the bar 50 a stop may be provided in the form of a bolt 70 of such size that it will not pass through the opening 65.

The crank shaft 60 has one end thereof bent laterally to provide a lever 71 having a loop 72 in its outer end to which a rope may be attached and extended to the tractor by which the harrow is to be pulled. By pulling forwardly on the lever 71 by means of a rope indicated at 73, the shaft 60 is caused to rotate in counter-clockwise direction when viewed in Fig. 2, causing the roller 57 to be swung upwardly and to lift the bar 50 from the position in which it is shown in full lines in Fig. 3 to the position in which it is shown in dotted lines 74, moving from engagement with the stop or bolt 66, any notch 67 of the bar 50 engaging such bolt 66 at this time.

For the purpose of controlling the movement of the following section C around the hinge-pin 48, and relative to the forward section B, I provide a movement-retarding means or brake member 75 which may consist, as shown in Fig. 4, of a brake drum 76 adapted to be mounted on a shaft 20 or 21 of the following section C, but preferably upon the shaft 21 for the reason that such shaft 21 is located at the right side of the following section C. Cooperating with the brake drum 76 is a brake shoe 78 carrying a transverse pin 80 by which it is secured to the ends of levers 82 in turn pivotally mounted on a bar 83 disposed between the bar 17 and the rightward bar 15 of the rearward frame 11, by means of a laterally extending pin 84 which is secured to the bar 83. The forward ends 85 of the levers 82 are connected by means of vertical links 86 to crank levers 87 which are secured to the shaft 60 in rearwardly projecting position. From Fig. 4 it will be perceived that when the shaft 60 is rotated in anti-clockwise direction, the brake shoe 78 will be moved toward engagement with the brake drum 76. The parts shown in Fig. 4 are so proportioned relative to the parts shown in Fig. 3 that the roller 58 of Fig. 3 will lift the bar 50 from engagement with the bolt 66 before the brake shoe 78 of Fig. 4 is applied to the brake drum 76. It is possible, therefore, to release the bar 50 without applying the brake 75, or by a continued forward rotation of the lever 71 it is possible to first release the bar 50 and then apply the brake 75 whereby to retard or stop the motion of the rightward portion of the following section C.

The draft means A includes a bar means 90 and a bar means 91, one or both of which may be adjustable in length. In the preferred form of construction, I prefer to make the bar 90 rigid or non-adjustable in length, and the bar 91 adjustable in length. The bar 90 is secured to the leftward end of the front bar 12 of the front frame 11 by means of a bolt 92 which extends through the end of a clip 93, of Fig. 2, secured to the end of the bar 90, and also through the extremity of the bar 90. The bar 91 consists of bar portions 96 and 97, the forward end of the bar portion 96 being secured by means of a bolt 98 to the forward portion of the bar 90, and the rearward end of the bar portion 97 having a clip 93 thereon and being secured to the frame 11 by means of a bolt 100. The rearward portion 101 of the bar portion 96 overlaps the forward end 102 of the bar portion 97, and flat loops 103 and 104 are formed respectively on the extremities of the bar portions 96 and 97 in positions to surround the bar portions 97 and 96 respectively, as shown in Figs. 1 and 5. One of the bar portions, such as the bar portion 96, is provided with a series of openings 106, and openings 107 and 108 are formed in the upper and lower walls 109 and 110 of the loop 104 so that a pin 112 may be passed through the openings in the loop and through an opening 106 in the bar portion 96. The loops 103 and 104 guide the overlapping portions of the bar portions 96 and 97 for longitudinal sliding movement and also hold the bar portions 96 and 97 in alignment so that the bar 91 is substantially rigid. The position of the end 114 of the bar 90 may be changed relative to the front of the harrow by varying the length of the bar 91, which may be accomplished without the use of tools and without the removal or replacement of bolts or screws, simply by lifting the pin 112 from engagement with the openings in the members 96 and 104, sliding the bar portion 96 relative to the bar portion 97 to a desired new position of operation, and then re-inserting the pin 112 through openings in the members 96 and 104.

The operation of the harrow is substantially as follows: Assuming that the harrow is being pulled forwardly with the leading and following sections B and C in the positions shown in Fig. 1, the swinging of the following section C rearwardly on the hinge-pin 48 into an angular position relative to the leading section B may be accomplished by pulling forwardly on the rope 73 to move the lever 71 forwardly a sufficient distance to release the bar 50. Should the disks 22 of the following section C be embedded in the soil at this time, the drag of such embedment will tend to hold the following section C substantially stationary, with the result that it will swing relative to the leading section B as the leading section B continues to move forwardly. But, should the harrow be on relatively hard soil, the mere releasing of the latch or bar 50 will not ordinarily cause the following section C to swing into open position, for the reason that the disks of the following section C tend to roll over the ground in forward direction. Therefore, the operator holds the lever 71 further forward so that the brake shoe 78 will be caused to engage the brake drum 76, retarding or stopping the rotation of the disks 22 mounted on the shaft 21 of the following section C, and providing sufficient drag to cause the rightward end of the following section C to remain stationary while the leftward portion of the following section C is pulled forwardly by the leading section B. When the following section C has swung to a desired position relative to the leading section B, the lever 71 is released, allowing the bar 50 to drop, the stop or bolt 66 to engage a selected notch 67 in the bar 50, and the brake shoe 78 to move from engagement with the brake drum 76. The engagement of the bar 50 with the stop or bolt 66 definitely locks the leading and following sections B and C together in a desired working or angular position. A spring 116, Fig. 4, may be connected so as to rotate the shaft 60 in clockwise direction, thereby normally holding it in inoperative position. Control of the following section C is also advantageous in the closing of the harrow or the swinging of the following section C to a position of reduced angularity relative to the leading section B, for such readjustment of the leading and following sections of the harrow is often found difficult, as there is a tendency for the following section C to roll rearwardly, especially on a hillside, instead of remaining stationary while the leading section B is being moved rearwardly by reversing the movement of the tractor. When it is desired to turn the harrow to the right, the lever 71 is pulled forwardly just far enough to raise the bar 50 into released position, without applying the brake shoe 78 to the brake drum 76. With the control parts in such position, the following section C will swing into closed position relative to the leading section B during the right-hand turn, and after the turn is made, the following section C may swing again to open position as the result of the drag of soil on the disks thereof; or should the soil drag be insufficient to produce the desired opening movement of the following section C, the brake 75 may be quickly actuated to retard or stop the following section C in a manner to cause it to swing into open position relative to the leading section B.

Various means may be employed in the practice of my invention to retard or stop the movement of the following section. Although the invention comprehends a brake adapted to engage the ground, I prefer to employ a means, such as the brake 75 of Fig. 4. Brake means engaging the ground is disclosed in Fig. 6, in which I show a wheel 120 mounted on the shaft 21, this wheel 120 having a series of lugs 121 formed on the periphery thereof adapted to be engaged by a pawl 122 which is mounted on a lever 123 and is therefore adapted to be moved into one of the spaces or notches 124 formed between the lugs 121. In Fig. 6 I again show the previously disclosed shaft 60, levers 87, and links 86 engaging the forward end of the lever 123, whereby to rotate the lever 123 on the hinge 126 to move the pawl 122 into engagement with the wheel 120 whereby to prevent rotation of the shaft 21 of the following section C and the disks 22 mounted thereon, such disks, upon being held from rotation, constituting brake means which drag upon the ground and retard free forward movement of the harrow section.

Although I have herein shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claims.

I claim as my invention:

1. An implement of the character described, including: a leading section; a following section, said following section having a transverse gang of harrow disks mounted thereon; means for moving said leading section; an eccentric pivot means connecting said sections whereby they may relatively swing on said pivot means together or apart between closed and open positions; a brake for retarding the movement of said following section; means for holding said sections in selected relative positions; and manually operated means for releasing said holding means and actuating said brake.

2. An implement of the character described, including: a leading section; a following section, said following section having a transverse gang of harrow disks mounted thereon; means for moving said leading section; an eccentric pivot means connecting said sections whereby they may relatively swing on said pivot means together or apart between closed and open positions; a brake for retarding the movement of said following section; means for holding said sections in selected relative positions; and manually operated means for releasing said holding means and actuating said brake, said last named means being adapted to release said holding means prior to the actuation of said brake.

3. An implement of the character described, including: a leading section; a following section, said following section having a transverse gang of harrow disks mounted thereon; means for moving said leading section; an eccentric pivot means connecting said sections whereby they may relatively swing on said pivot means together or apart between closed and open positions; a brake for retarding the movement of said following section; a latch bar pivotally connected to said leading section and extending to said following section; a catch member mounted on said following section and adapted to be engaged by said latch bar; a lever mounted on said following section and adapted to be selectively moved by an operator; and means actuated by said lever to move said latch bar from engagement with said catch member and to actuate said brake.

4. An implement of the character described, including: a leading section; a following section, said following section having a transverse gang of harrow disks mounted thereon; means for moving said leading section; an eccentric pivot means connecting said sections whereby they may relatively swing on said pivot means together or apart between closed and open positions; a brake for retarding the movement of said following section; a latch bar pivotally connected to said leading section and extending to said following section; a catch member mounted on said following section and adapted to be engaged by said latch bar; a lever mounted on said following section and adapted to be selectively moved by an operator; a horizontal shaft on said following section connected to said lever so as to be rotated thereby; lever means on said shaft for moving said latch bar from engagement with said catch member; and lever means on said shaft for actuating said brake.

5. A harrow of the character described, including: a leading section; a following section, said sections having earth-engaging tools in the form of rotary disks; means for moving said leading section; an eccentric pivot means connecting said sections whereby they may relatively swing on said pivot means together or apart between closed and open positions; a brake for retarding the movement of said following section in both forward and rearward directions; means for holding said sections in selected relative positions; and manually operaated means for releasing said holding means and actuating said brake.

6. A harrow of the character described, including: a leading section; a following section, said sections having earth-engaging tools in the form of rotary disks; means for moving said leading section; an eccentric pivot means connecting said sections whereby they may relatively swing on said pivot means together or apart between closed and open positions; a brake for retarding the movement of said following section in both forward and rearward directions; means for holding said sections in selected relative positions; and manually operated means for releasing said holding means and actuating said brake, said last named means being adapted to release said holding means prior to the actuation of said brake.

7. A harrow of the character described, including: a leading section; a following section, said sections having earth-engaging tools in the form of rotary disks; means for moving said leading section; an eccentric pivot means connecting said sections whereby they may relatively swing on said pivot means together or apart between closed and open positions; a brake for retarding the movement of said following section in both forward and rearward directions; a latch bar pivotally connected to said leading section and extending to said following section; a catch member mounted on said following section and adapted to be engaged by said latch bar; a lever mounted on said following section and adapted to be selectively moved by an operator; a horizontal shaft on said following section connected to said lever so as to be rotated thereby; lever means on said shaft for moving said latch bar from engagement with said catch member; and lever means on said shaft for actuating said brake.

8. A harrow of the character described, including: a leading section; a following section, said sections having earth-engaging tools in the form of rotary disks; means for moving said leading section; an eccentric pivot means connecting said sections whereby they may relatively swing on said pivot means together or apart between closed and open positions, said pivot means comprising a member extending from one side of one of said sections toward the other of said sections and providing a horizontal opening, means extending from a similar side of the other of said sections into said opening, and means connecting said member and said means of said pivot means together so as to swing relatively on a vertical axis; a brake for retarding the movement of said following section in both forward and rearward directions; a latch bar pivotally connected to said leading section and extending to said following section; a catch member mounted on said following section and adapted to be engaged by said latch bar; a lever mounted on said following section and adapted to be selectively moved by an operator; a horizontal shaft on said following section connected to said lever so as to be rotated thereby; lever means on said shaft for moving said latch bar from engagement with said catch member; and lever means on said shaft for actuating said brake.

9. An implement of the character described, including: a leading section; a following section, said following section having disk means thereon in rolling engagement with the ground; means for moving said leading section; an eccentric pivot means connecting said sections whereby they may relatively move between closed and open positions; and a brake having operative connection with said disk means for retarding the movement of said following section.

10. An implement of the character described, including: a leading section; a following section, said following section having disk means thereon in rolling engagement with the ground; means for moving said leading section; an eccentric pivot means connecting said sections whereby they may relatively move between closed and open positions; a brake having operative connection with said disk means for retarding the movement of said following section; and manually releasable means for holding said sections in desired relative positions.

11. An implement of the character described, including: a leading section; a following section, said following section having disk means thereon in rolling engagement with the ground; means for moving said leading section; an eccentric pivot means connecting said sections whereby they may relatively move between closed and open positions; a brake having operative connection with said disk means for retarding the movement of said following section; means for holding said sections in selected relative positions; and manually operated means for releasing said holding means and actuating said brake.

12. An implement of the character described, including: a leading section; a following section, said following section having disk means thereon in rolling engagement with the ground; means for moving said leading section; an eccentric pivot means connecting said sections whereby they may relatively move between closed and open positions; a brake having operative connection with said disk means for retarding the movement of said following section; means for holding said sections in selected relative positions; and manually operated means for releasing said holding means and actuating said brake, said last named means being adapted to release said holding means prior to the actuation of said brake.

13. An implement of the character described, including: a leading section; a following section, said following section having disk means thereon in rolling engagement with the ground; means for moving said leading section; an eccentric pivot means connecting said sections whereby they may relatively move between closed and open positions; a brake having operative connection with said disk means for retarding the movement of said following section; a latch bar pivotally connected to said leading section and extending to said following section; a catch member mounted on said following section and adapted to be engaged by said latch bar; a lever mounted on said following section and adapted to be selectively moved by an operator; and means actuated by said lever to move said latch bar from engagement with said catch member and to actuate said brake.

14. An implement of the character described, including: a leading section; a following section, said following section having disk means thereon in rolling engagement with the ground; means for moving said leading section; an eccentric pivot means connecting said sections whereby they may relatively move between closed and open positions; a brake having operative connection with said disk means for retarding the movement of said following section; a latch bar pivotally connected to said leading section and extending to said following section; a catch member mounted on said following section and adapted to be engaged by said latch bar; a lever mounted on said following section and adapted to be selectively moved by an operator; a horizontal shaft on said following section connected to said lever so as to be rotated thereby; lever means on said shaft for moving said latch bar from engagement with said catch member; and lever means on said shaft for actuating said brake.

SAMUEL S. FURRER.